(12) United States Patent
Fuchigami

(10) Patent No.: US 9,298,530 B2
(45) Date of Patent: Mar. 29, 2016

(54) SEMICONDUCTOR DEVICE THAT DETECTS ABNORMALITIES OF WATCHDOG TIMER CIRCUITS

(71) Applicant: Renesas Electronics Corporation, Kanagawa (JP)

(72) Inventor: Takashi Fuchigami, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 14/527,946

(22) Filed: Oct. 30, 2014

(65) Prior Publication Data

US 2015/0052407 A1   Feb. 19, 2015

Related U.S. Application Data

(63) Continuation of application No. 13/181,193, filed on Jul. 12, 2011, now Pat. No. 8,909,997.

(30) Foreign Application Priority Data

Jul. 12, 2010 (JP) .................................. 2010-157584

(51) Int. Cl.
*G06F 11/00* (2006.01)
*G06F 11/07* (2006.01)

(52) U.S. Cl.
CPC .......... *G06F 11/0757* (2013.01); *G06F 11/079* (2013.01); *G06F 11/0721* (2013.01); *G06F 11/0772* (2013.01)

(58) Field of Classification Search
CPC .................................................. G06F 11/0757
See application file for complete search history.

(56) References Cited

U.S. PATENT DOCUMENTS

| | | | |
|---|---|---|---|
| 5,809,229 A | 9/1998 | Mori | |
| 6,490,692 B1 | 12/2002 | Nomura et al. | |
| 6,498,403 B1 | 12/2002 | Hagidaira et al. | |
| 6,883,123 B2 | 4/2005 | Hashimoto et al. | |
| 2003/0079163 A1 | 4/2003 | Hashimoto et al. | |
| 2008/0215913 A1 | 9/2008 | Terayama et al. | |
| 2008/0229158 A1 | 9/2008 | Saito | |

FOREIGN PATENT DOCUMENTS

| | | |
|---|---|---|
| EP | 1843247 A1 | 10/2007 |
| JP | 2003-131906 A | 5/2003 |

OTHER PUBLICATIONS

Extended European Search Report dated Jan. 5, 2012 issued in European Patent Application No. 11172556.0-1225.
Communication dated Dec. 15, 2014 from the State Intellectual Property Office of the People's Republic of China in counterpart Chinese Patent Application No. 201110201165.1.
Communication dated May 7, 2015 from the State Intellectual Property Office of the People's Republic of China in counterpart Chinese Patent Application No. 201110201165.1.

*Primary Examiner* — Christopher McCarthy
(74) *Attorney, Agent, or Firm* — Sughrue Mion, PLLC

(57) ABSTRACT

A diagnosis circuit 1 monitors a watchdog timer 2 and supplies a diagnosis result signal 1 indicating whether a monitoring result is normal or not to a diagnosis circuit 2. A diagnosis circuit 3 monitors a watchdog timer 1 and supplies a diagnosis result signal 3 indicating whether a monitoring result is normal or not to the diagnosis circuit 2. The diagnosis circuit 2 determines that the diagnosis circuit 1 or the watchdog timer 2 is abnormal when the diagnosis result signal 1 does not have a value indicating normal. Further, the diagnosis circuit 2 determines that the diagnosis circuit 3 or the watchdog timer 1 is abnormal when the diagnosis result signal 3 does not have a value indicating normal.

8 Claims, 15 Drawing Sheets

| DIAGNOSIS RESULT | | ABNORMAL PART |
|---|---|---|
| DIAGNOSIS CIRCUIT 1 | OK | NORMAL |
| | NG | WATCHDOG TIMER 2 |
| DIAGNOSIS CIRCUIT 2 | OK | NORMAL |
| | NG | (DIAGNOSIS CIRCUIT 1, WDT2) OR (DIAGNOSIS CIRCUIT 3, WDT1) |
| DIAGNOSIS CIRCUIT 3 | OK | NORMAL |
| | NG | WATCHDOG TIMER 1 |

Fig. 2

| DIAGNOSIS RESULT | | ABNORMAL PART |
|---|---|---|
| DIAGNOSIS CIRCUIT 1 | OK | NORMAL |
| | NG | WATCHDOG TIMER 2 |
| DIAGNOSIS CIRCUIT 2 | OK | NORMAL |
| | NG | (DIAGNOSIS CIRCUIT 1, WDT2) OR (DIAGNOSIS CIRCUIT 3, WDT1) |
| | NO NOTIFICATION | DIAGNOSIS CIRCUIT 2 |
| DIAGNOSIS CIRCUIT 3 | OK | NORMAL |
| | NG | WATCHDOG TIMER 1 |

Fig. 4

| | | Supply of diagnosis result signals 1 to 3 (HIGH) | No supply of diagnosis result signal 1 (HIGH) | | No supply of diagnosis result signal 2 (HIGH) | | No supply of diagnosis result signal 3 (HIGH) | |
|---|---|---|---|---|---|---|---|---|
| | | | Supply of diagnosis circuit 1 operation notification signal | No supply of diagnosis circuit 1 operation notification signal | Supply of diagnosis circuit 2 operation notification signal | No supply of diagnosis circuit 2 operation notification signal | Supply of diagnosis circuit 3 operation notification signal | No supply of diagnosis circuit 3 operation notification signal |
| DIAGNOSIS CIRCUIT 1 | OK (WDT2 IS DETERMINED TO BE NORMAL) | 1 NORMAL | ... | ... | 15 DIAGNOSIS CIRCUIT 1 | 16 DIAGNOSIS CIRCUIT 2 | 23 WDT1 | 24 DIAGNOSIS CIRCUIT 3 |
| | NG (WDT2 IS DETERMINED TO BE ABNORMAL) | 2 WDT2 | ... | ... | 17 | 18 | 25 | 26 |
| DIAGNOSIS CIRCUIT 2 | OK (CIRCUIT 1 IS DETERMINED TO BE NORMAL) | 3 NORMAL | 7 WDT2 | 8 DIAGNOSIS CIRCUIT 1 | ... | ... | 27 WDT1 | 28 DIAGNOSIS CIRCUIT 3 |
| | NG (CIRCUIT 1 IS DETERMINED TO BE ABNORMAL) | 4 DIAGNOSIS CIRCUIT 1 | 9 | 10 DIAGNOSIS CIRCUIT 1 | ... | ... | 29 | 30 |
| DIAGNOSIS CIRCUIT 3 | OK (WDT1 IS DETERMINED TO BE NORMAL) | 5 NORMAL | 11 WDT2 | 12 DIAGNOSIS CIRCUIT 1 | 19 DIAGNOSIS CIRCUIT 1 | 20 DIAGNOSIS CIRCUIT 2 | ... | ... |
| | NG (WDT2 IS DETERMINED TO BE ABNORMAL) | 6 WDT1 | 13 | 14 | 21 | 22 | ... | ... |

Fig. 6

| | | SUPPLY OF DIAGNOSIS RESULT SIGNALS 1 to 3 (HIGH) | NO SUPPLY OF DIAGNOSIS RESULT SIGNAL 1 (HIGH) | | NO SUPPLY OF DIAGNOSIS RESULT SIGNAL 2 (HIGH) | | NO SUPPLY OF DIAGNOSIS RESULT SIGNAL 3 (HIGH) | |
|---|---|---|---|---|---|---|---|---|
| | | | SUPPLY OF OPERATION NOTIFICATION SIGNAL FROM DIAGNOSIS CIRCUIT 1 | NO SUPPLY OF OPERATION NOTIFICATION SIGNAL FROM DIAGNOSIS CIRCUIT 1 | SUPPLY OF OPERATION NOTIFICATION SIGNAL FROM DIAGNOSIS CIRCUIT 2 | NO SUPPLY OF OPERATION NOTIFICATION SIGNAL FROM DIAGNOSIS CIRCUIT 2 | SUPPLY OF OPERATION NOTIFICATION SIGNAL FROM DIAGNOSIS CIRCUIT 3 | NO SUPPLY OF OPERATION NOTIFICATION SIGNAL FROM DIAGNOSIS CIRCUIT 3 |
| DIAGNOSIS CIRCUIT 1 | OK (WDT 2 IS DETERMINED TO BE NORMAL) | 1 NORMAL | --- | --- | 15 DIAGNOSIS CIRCUIT 1 | 16 ---- | 23 WDT1 | 24 DIAGNOSIS CIRCUIT 3 |
| | NG (WDT 2 IS DETERMINED TO BE ABNORMAL) | 2 WDT2 | --- | --- | 17 --- | 18 --- | 25 --- | 26 CS3 |
| DIAGNOSIS CIRCUIT 2 | OK (CIRCUIT 1 IS DETERMINED TO BE NORMAL) | 3 NORMAL | 7 WDT2 | 8 CS2 OR CIRCUIT 1 | --- | --- | 27 WDT1 | 28 --- |
| | NG (CIRCUIT 1 IS DETERMINED TO BE ABNORMAL) | 4 DIAGNOSIS CIRCUIT 1 | 9 --- | 10 CS2 OR CIRCUIT 1 | --- | --- | 29 --- | 30 --- |
| DIAGNOSIS CIRCUIT 3 | OK (WDT 1 IS DETERMINED TO BE NORMAL) | 5 NORMAL | 11 WDT2 | 12 CS2 OR CIRCUIT 1 | 19 DIAGNOSIS CIRCUIT 1 | 20 DIAGNOSIS CIRCUIT 2 | --- | --- |
| | NG (WDT 1 IS DETERMINED TO BE ABNORMAL) | 6 WDT1 | 13 --- | 14 --- | 21 --- | 22 CS1 | --- | --- |

Fig. 9

| COUNT OF WDT2 | DETERMINATION RESULT |
|---|---|
| 0 | ABNORMAL (WDT2 OR CS3) |
| 1 | NORMAL |
| 2 | NORMAL |
| 3 OR MORE | ABNORMAL (CLOCK SOURCE 3 IS TOO FAST) |

Fig. 15

SEMICONDUCTOR DEVICE THAT DETECTS ABNORMALITIES OF WATCHDOG TIMER CIRCUITS

CROSS-REFERENCE TO RELATED APPLICATIONS

This application is a Continuation Application of U.S. application Ser. No. 13/181,193 filed Jul. 12, 2011, which claims priority from Japanese Patent Application No. 2010-157584, filed on Jul. 12, 2010, the disclosures of which is incorporated herein by reference in their entirety.

BACKGROUND

The present invention relates to a semiconductor device.

One of protection measures against runaway of a CPU (Central Processing Unit) that is incorporated into electronic equipment or the like is use of a watchdog timer. The watchdog timer does not operate forever when the CPU to be monitored is in normal condition. However, the watchdog timer needs to operate properly when the CPU comes in abnormal condition. Therefore, enhancement of the reliability of the watchdog timer is important to respond to CPU anomaly.

Japanese Unexamined Patent Application Publication No. 2003-131906 discloses a technique to check the operation of a watchdog timer. Electronic equipment disclosed therein has two watchdog timers for a CPU. Each watchdog timer has an internal counter and performs counting. The CPU supplies watchdog clear signals to the two watchdog timers. When the watchdog clear signal is supplied, each watchdog timer clears the internal count value. When the count value overflows, the watchdog timer supplies a reset signal to a logical connector. When reset signals from the two watchdog timers are supplied to the logical connector, the logical connector supplies a reset signal to the CPU. Thus, the CPU is not reset when the reset signal is output from only one watchdog timer.

The CPU intentionally stops one watchdog clear signal during operation and determines whether the watchdog timer to which the signal has been supplied operates properly. In other words, the CPU determines whether the watchdog timer outputs a reset signal or not. By the above operation, the electronic equipment disclosed in Japanese Unexamined Patent Application Publication No. 2003-131906 can determine whether the watchdog timer operates properly during the operation of the CPU.

SUMMARY

The present inventors have found a problem that the electronic equipment disclosed in Japanese Unexamined Patent Application Publication No. 2003-131906 fails to properly detect a failure of the watchdog timer when there is a failure in a part to be used for checking the operation of the watchdog timer. For example, when a failure occurs in the logical connector to which reset signals are supplied from the two watchdog timers, it fails to properly detect an anomaly of the watchdog timer.

A first aspect of the present invention is a semiconductor device including an arithmetic and logic unit, a first watchdog timer used for runaway monitoring of the arithmetic and logic unit, a second watchdog timer used for runaway monitoring of the arithmetic and logic unit, and first to third diagnosis circuits, in which the first diagnosis circuit monitors the second watchdog timer and generates a first diagnosis result signal indicating whether a monitoring result is abnormal or not, the third diagnosis circuit monitors the first watchdog timer and generates a second diagnosis result signal indicating whether a monitoring result is abnormal or not, and the second diagnosis circuit determines whether the first diagnosis circuit is abnormal or not based on the first diagnosis result signal, and determines whether the third diagnosis circuit is abnormal or not based on the second diagnosis result signal.

In the aspect of the present invention, notifications as to whether a target of monitoring is normal or not are provided from the first diagnosis circuit and the third diagnosis circuit to the second diagnosis circuit. The second diagnosis circuit conducts diagnosis of the first and third diagnosis circuits that monitor the corresponding watchdog timers. In this configuration, the semiconductor device according to the aspect of the invention can develop an appropriate response when an anomaly occurs in the diagnosis circuit that monitors the watchdog timer. According to the aspect of the present invention described above, it is possible to provide a semiconductor device capable of developing an appropriate response when an anomaly occurs in a circuit to be used for failure diagnosis of a watchdog timer.

BRIEF DESCRIPTION OF THE DRAWINGS

The above and other aspects, advantages and features will be more apparent from the following description of certain embodiments taken in conjunction with the accompanying drawings, in which:

FIG. 2 is a view showing anomaly determination of the semiconductor device according to the first embodiment;

FIG. 4 is a view showing anomaly determination of the semiconductor device according to the second embodiment;

FIG. 6 is a view showing anomaly determination of the semiconductor device according to the third embodiment;

FIG. 9 is a view showing anomaly determination of the semiconductor device according to the fourth embodiment;

FIG. 15 is a view showing frequency anomaly determination of the semiconductor device according to the fifth embodiment.

DETAILED DESCRIPTION

First Embodiment

Figure 1:
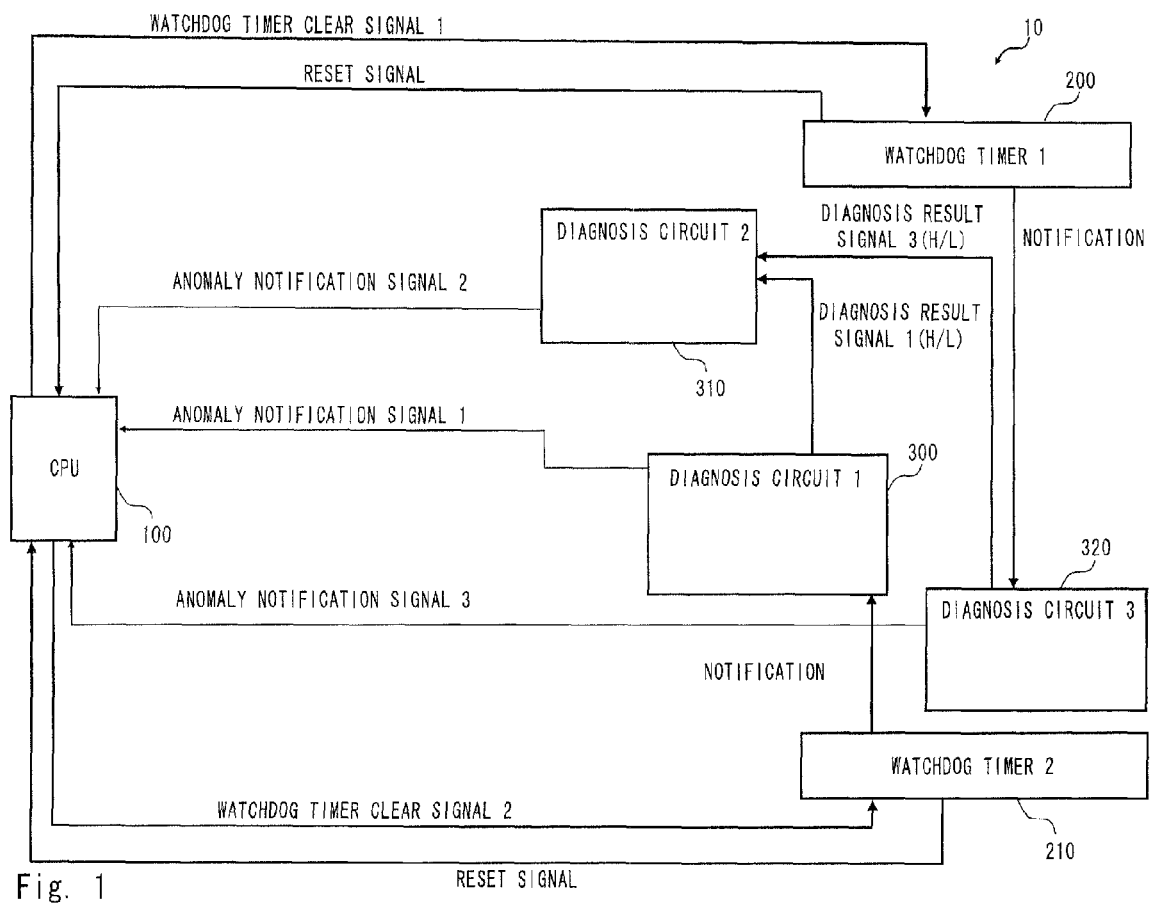
FIG. 1 is a block diagram showing a configuration of a semiconductor device according to a first embodiment.

An embodiment of the present invention is described hereinafter with reference to the drawings. FIG. 1 is a block diagram showing a configuration of a semiconductor device according to the embodiment. The semiconductor device may be a semiconductor device such as a microcomputer with a built-in flash memory, or a microcomputer with a built-in mask ROM (Read Only Memory) or a multi-CPU processor, for example.

The semiconductor device 10 includes a CPU 100, a watchdog timer 1 (200), a watchdog timer 2 (210), a diagnosis circuit 1 (300), a diagnosis circuit 2 (310), and a diagnosis circuit 3 (320).

The CPU 100 is an arithmetic and logic unit for which runaway monitoring is performed by the watchdog timers. The CPU 100 supplies watchdog timer clear signals to the watchdog timer 1 (200) and the watchdog timer 2 (210). The watchdog timer clear signal is a signal to reset the count in the watchdog timer so that the watchdog timer does not supply a reset signal to the CPU 100. When the count value of the watchdog timer overflows (when it exceeds a specified value), a reset signal is supplied to the CPU 100. Further, when each diagnosis circuit (the diagnosis circuit 1 (300), the diagnosis circuit 2 (310), the diagnosis circuit 3 (320)) detects that a target of monitoring by each diagnosis circuit is in abnormal condition, an anomaly notification signal is supplied to the CPU 100. When the anomaly notification signal is supplied to the CPU 100, the CPU 100 performs fail-safe operation on an abnormal part. The details of the fail-safe operation are described later.

The watchdog timer 1 (200) detects runaway of the CPU 100. The watchdog timer 1 (200) has an internal counter that counts the clock. When the count value of the counter overflows, the watchdog timer 1 (200) supplies a reset signal to the CPU 100. Further, when a watchdog timer clear signal is supplied from the CPU 100, the watchdog timer 1 (200) resets the internal count value. Furthermore, the watchdog timer 1 (200) gives a notification to the diagnosis circuit 3 (320) according to the clock count. The notification is provided when the watchdog timer 1 (200) performs count-up operation normally.

The watchdog timer 2 (210) detects runaway of the CPU 100. The watchdog timer 2 (210) has an internal counter that counts the clock. When the count value of the counter overflows, the watchdog timer 2 (210) supplies a reset signal to the CPU 100. Further, when a watchdog timer clear signal is supplied from the CPU 100, the watchdog timer 2 (210) resets the internal count value. Furthermore, the watchdog timer 2 (210) gives a notification to the diagnosis circuit 2 (310) according to the clock count. The notification is provided when the watchdog timer 2 (210) performs count-up operation normally.

The diagnosis circuit 1 (300) conducts operation diagnosis of the watchdog timer 2 (210). The diagnosis circuit 1 (300) supplies a diagnosis result signal 1 that indicates a diagnosis result of the operation of the watchdog timer 2 (210) to the diagnosis circuit 2 (310). Specifically, when the notification of the clock count is sent from the watchdog timer 2 (210), the diagnosis circuit 1 (300) supplies the diagnosis result signal 1 (HIGH) indicating that the watchdog timer 2 (210) is in normal condition to the diagnosis circuit 2 (310). The diagnosis result signal 1 is a so-called pulse wave, and it is HIGH only when normal determination is made. On the other hand, when the diagnosis circuit 1 (300) determines that the watchdog timer 2 (210) is in abnormal condition, the diagnosis circuit 1 (300) supplies an anomaly notification signal 1 to the CPU 100. Note that the diagnosis result signal 1 may be a signal that becomes LOW when normal determination is made, as long as it is possible to notify the normal/abnormal condition of the watchdog timer 2 (210). The same applies to diagnosis result signals 2 and 3, which are described later.

The diagnosis circuit 3 (320) conducts operation diagnosis of the watchdog timer 1 (200). The diagnosis circuit 3 (320) supplies a diagnosis result signal 3 that indicates a diagnosis result of the operation of the watchdog timer 1 (200) to the diagnosis circuit 2 (310). Specifically, when the notification of the clock count is sent from the watchdog timer 1 (200), the diagnosis circuit 3 (320) supplies the diagnosis result signal 3 (HIGH) indicating that the watchdog timer 1 (200) is in normal condition to the diagnosis circuit 2 (310). On the other hand, when the diagnosis circuit 3 (320) determines that the watchdog timer 1 (200) is in abnormal condition, the diagnosis circuit 3 (320) supplies an anomaly notification signal 3 to the CPU 100.

The diagnosis result signals are supplied to the diagnosis circuit 2 (310) from the diagnosis circuit 1 (300) and the diagnosis circuit 3 (320). When the diagnosis result signal 1 (HIGH) indicating normal condition is not supplied from the diagnosis circuit 1 (300), the diagnosis circuit 2 (310) determines that the diagnosis circuit 1 (300) or the watchdog timer 2 (210) is in abnormal condition. Likewise, when the diagnosis result signal 3 (HIGH) indicating normal condition is not supplied from the diagnosis circuit 3 (320), the diagnosis circuit 2 (310) determines that the diagnosis circuit 3 (320) or the watchdog timer 1 (200) is in abnormal condition. Then, the diagnosis circuit 2 (310) supplies an anomaly notification signal 2 for notifying an abnormal part to the CPU 100. Next, a relationship between a diagnosis result of each diagnosis circuit and an abnormal part is described with reference to FIG. 2. FIG. 2 is a table showing a relationship between a diagnosis result of each diagnosis circuit and an abnormal part. In the table of FIG. 2, "OK" indicates that it is determined that a monitoring target is not abnormal. On the other hand, "NG" indicates that it is determined that a monitoring target is abnormal.

When the diagnosis circuit 1 (300) makes anomaly determination, it is determined that the watchdog timer 2 (210) is in abnormal condition. The diagnosis circuit 1 (300) notifies the abnormal part to the CPU 100 by using the anomaly notification signal 1. Receiving the anomaly notification signal 1, the CPU 100 shuts down the watchdog timer 2 (210), for example, as the fail-safe operation.

When the diagnosis result signal 1 (HIGH) indicating that the watchdog timer 2 (210) is in normal condition is not supplied from the diagnosis circuit 1 (300) to the diagnosis circuit 2 (310), the diagnosis circuit 2 (310) determines that the diagnosis circuit 1 (300) or the watchdog timer 2 (210) is in abnormal condition. Then, the diagnosis circuit 2 (310) notifies that the diagnosis circuit 1 (300) or the watchdog timer 2 (210) is abnormal to the CPU 100 by using the anomaly notification signal 2. Receiving the anomaly notification signal 2, the CPU 100 shuts down the watchdog timer 2 (210), for example, as the fail-safe operation.

When the diagnosis result signal 3 (HIGH) indicating that the watchdog timer 1 (200) is in normal condition is not supplied from the diagnosis circuit 3 (320) to the diagnosis circuit 2 (310), the diagnosis circuit 2 (310) determines that the diagnosis circuit 3 (320) or the watchdog timer 1 (200) is in abnormal condition. Then, the diagnosis circuit 2 (310) notifies that the diagnosis circuit 3 (320) or the watchdog timer 1 (200) is abnormal to the CPU 100 by using the anomaly notification signal 2. Receiving the anomaly notification signal 2, the CPU 100 shuts down the watchdog timer 1 (200), for example, as the fail-safe operation.

When the diagnosis circuit 3 (320) makes anomaly determination, it is determined that the watchdog timer 1 (200) is in abnormal condition. The diagnosis circuit 3 (320) notifies the abnormal part to the CPU 100 by using the anomaly notification signal 3. Receiving the anomaly notification signal 3, the CPU 100 shuts down the watchdog timer 1 (200), for example, as the fail-safe operation.

It should be noted that, although the CPU 100 performs the fail-safe operation to shut down an abnormal part or the like, it is not limited thereto. The diagnosis circuit which has identified an abnormal part may shut down the abnormal part. For example, the diagnosis circuit 2 (310) which has detected that the diagnosis circuit 3 (320) or the watchdog timer 1 (200) is in abnormal condition may shut down the watchdog timer 1 (200).

Advantages of the semiconductor device according to the embodiment are described hereinafter. As described above, the semiconductor device 10 includes the diagnosis circuit 2 (310) to which diagnosis result signals are supplied from the diagnosis circuit 1 (300) and the diagnosis circuit 3 (320) that monitor the corresponding watchdog timers. The diagnosis circuit 2 (310) can determine that the diagnosis circuit from which a diagnosis result signal is not supplied or the watchdog timer which is monitored by that diagnosis circuit is in abnormal condition. The CPU 100 can perform appropriate fail-safe operation for the part that is determined to be abnormal. It is thereby possible to perform fail-safe operation appropriately even when there is an anomaly in the circuit that is monitoring the watchdog timer.

The correspondence between the elements of the semiconductor device according to the embodiment and the appended claims is given hereinbelow. The diagnosis circuit 1 (300) corresponds to a first diagnosis circuit described in the appended claims. The diagnosis circuit 2 (310) corresponds to a second diagnosis circuit described in the appended claims. The diagnosis circuit 3 (320) corresponds to a second diagnosis circuit described in the appended claims. The diagnosis circuit 2 (310) corresponds to a third diagnosis circuit described in the appended claims. The diagnosis result signal 1 corresponds to a first diagnosis result signal described in the appended claims. The diagnosis result signal 3 corresponds to a second diagnosis result signal described in the appended claims. The watchdog timer 1 corresponds to a first watchdog timer described in the appended claims. The watchdog timer 2 corresponds to a second watchdog timer described in the appended claims. The correspondence is the same in the following embodiments.

Second Embodiment

Figure 3:
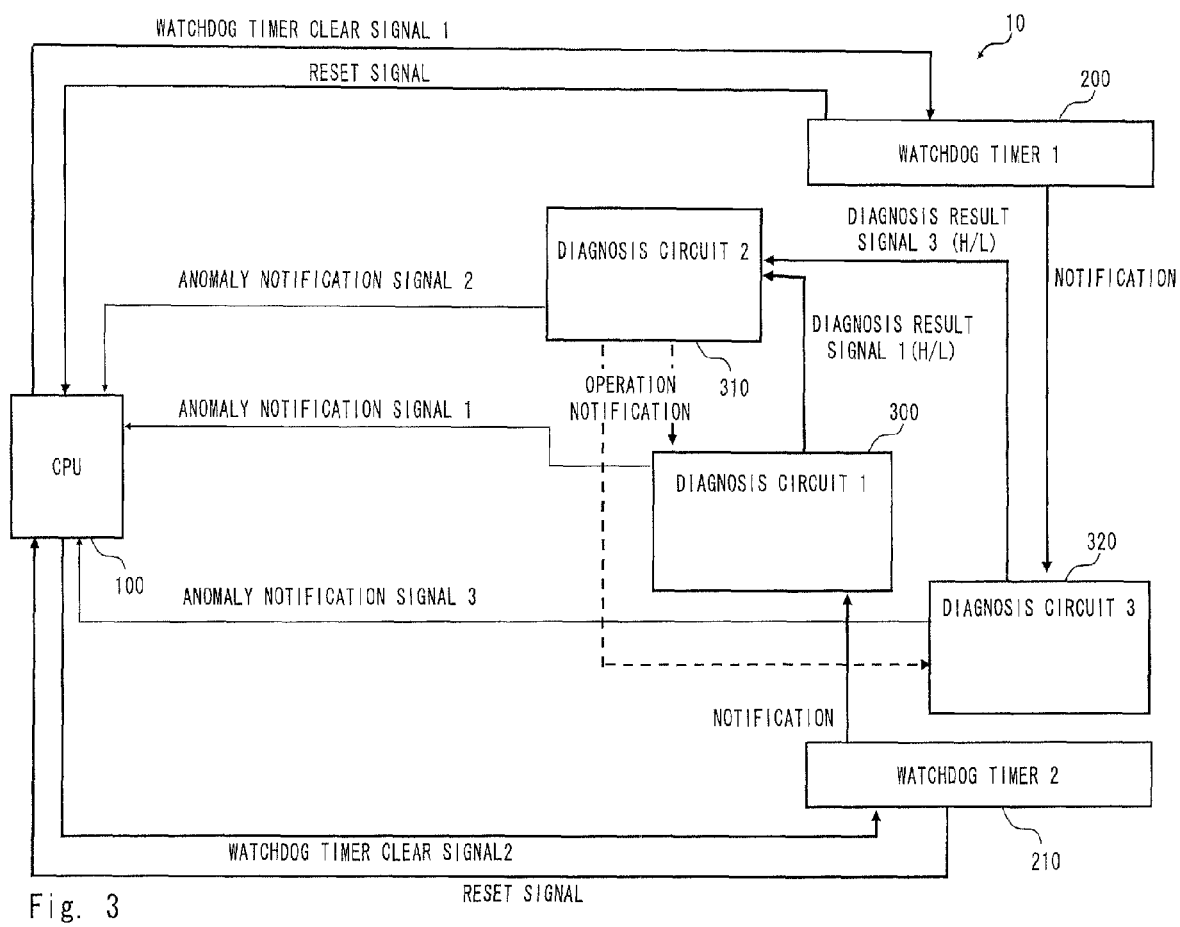
FIG. 3 is a block diagram showing a configuration of a semiconductor device according to a second embodiment.

A semiconductor device according to a second embodiment of the invention is characterized in that the diagnosis circuit 2 notifies that it is in normal operating condition to the diagnosis circuits 1 and 3. The basic configuration and operation of the semiconductor device according to the embodiment are described hereinafter with reference to FIG. 3, focusing on differences from the first embodiment.

The diagnosis circuit 2 (310) supplies operation notification signals indicating that the diagnosis circuit 2 (310) itself is normally operating to the diagnosis circuit 1 (300) and the diagnosis circuit 3 (320) on a regular basis. The diagnosis circuit 1 (300) and the diagnosis circuit 3 (320) makes determination whether the diagnosis circuit 2 (310) is operating properly or not in addition to the anomaly determination of the watchdog timers. Specifically, when the operation notification signal is not supplied regularly from the diagnosis circuit 2 (310), the diagnosis circuit 1 (300) and the diagnosis circuit 3 (320) determine that the diagnosis circuit 2 (310) in abnormal condition. When determining that the diagnosis circuit 2 (310) is abnormal, the diagnosis circuit 1 (300) or the diagnosis circuit 3 (320) notifies that to the CPU 100 by the anomaly notification signal. The CPU 100 performs fail-safe operation for the diagnosis circuit 2 (310) determined to be abnormal. For example, the CPU 100 displays that the diagnosis circuit 2 (310) is in abnormal condition on a display unit of electronic equipment that incorporates the CPU 100.

Next, a relationship between a diagnosis result of each diagnosis circuit and an abnormal part is described with reference to FIG. 4. FIG. 4 is a table showing a relationship between a diagnosis result of each diagnosis circuit and an abnormal part. This embodiment is different from the first embodiment in that it is determined that the diagnosis circuit 2 (310) is in abnormal condition when the diagnosis circuit 2 (310) does not supply the operation notification signal.

Advantages of the semiconductor device according to the embodiment are described hereinafter. In the semiconductor device according to the embodiment, the diagnosis circuit 1 (300) and the diagnosis circuit 3 (320) can check whether the diagnosis circuit 2 (310) is normally operating or not on a regular basis. Therefore, when the diagnosis circuit 2 (310) is in abnormal condition, the CPU 100 or another circuit can perform appropriate fail-safe operation. Accordingly, more precise fail-safe control can be performed compared to the first embodiment.

It should be noted that the diagnosis circuit 2 (310) does not necessarily provide the operation notification signals to both of the diagnosis circuit 1 (300) and the diagnosis circuit 3 (320), and it may provide the signal to either one of them. In this case, the diagnosis circuit to which the operation notification signal is supplied conducts anomaly diagnosis of the diagnosis circuit 2 (310).

The operation notification signal that is output from the diagnosis circuit 2 (310) corresponds to a first operation notification signal described in the appended claims. The correspondence is the same in the following embodiments.

Third Embodiment

Figure 5:
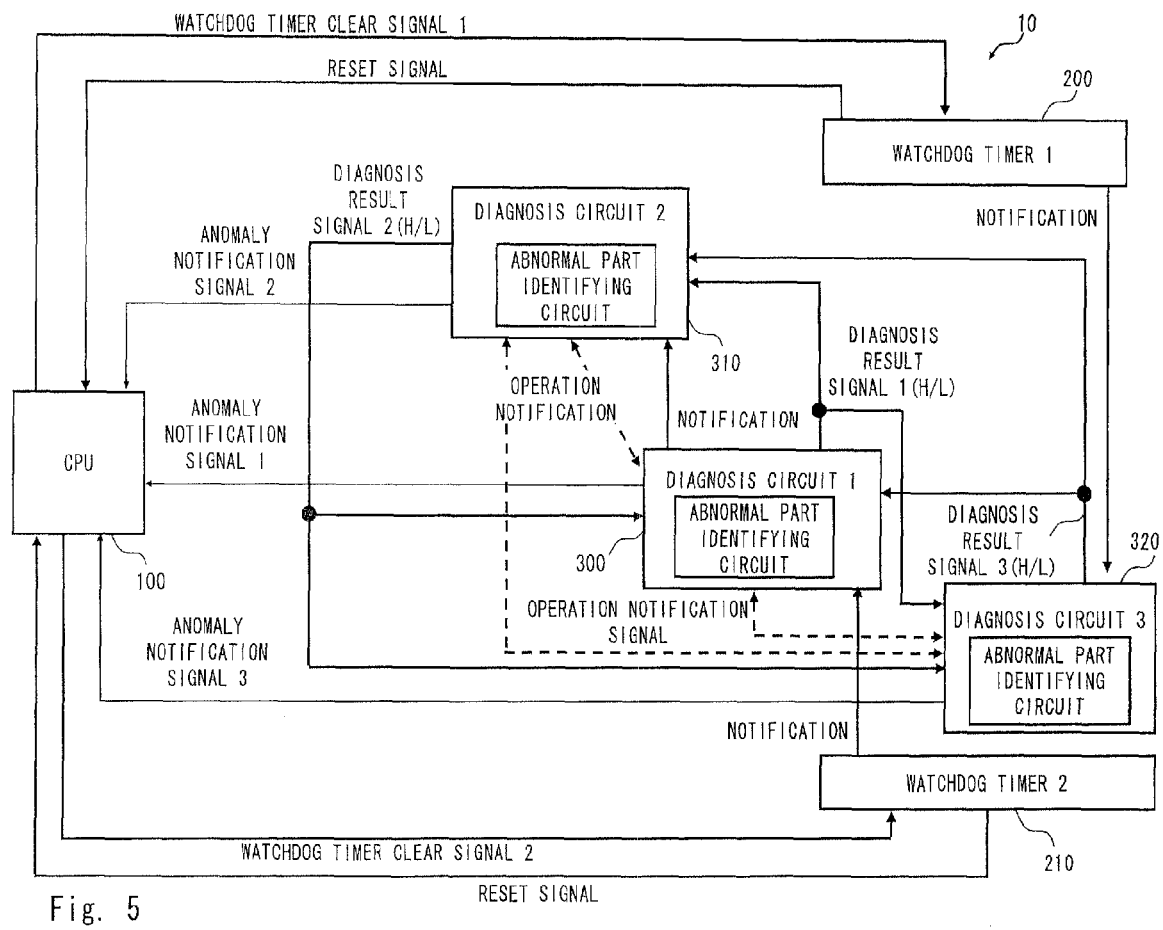
FIG. 5 is a block diagram showing a configuration of a semiconductor device according to a third embodiment.

A semiconductor device according to a third embodiment of the invention is characterized in that the diagnosis circuits supply the operation notification signals to one another other. The basic configuration and operation of the semiconductor device according to the embodiment are described hereinafter with reference to FIG. 5, focusing on differences from the first and second embodiments.

The diagnosis circuit 1 (300) supplies a diagnosis result signal 1 to the diagnosis circuit 2 (310) and the diagnosis circuit 3 (320). The diagnosis result signal 1 is a pulse signal that becomes HIGH only when the watchdog timer 2 (210) is normally operating, just like in the first and second embodiments.

Further, the diagnosis circuit 1 (300) supplies an operation notification signal indicating that the diagnosis circuit 1 (300) itself is normally operating to the diagnosis circuit 2 (310) and the diagnosis circuit 3 (320) on a regular basis.

The diagnosis circuit 1 (300) has an internal counter that counts the clock. The diagnosis circuit 1 (300) gives a notification to the diagnosis circuit 2 (310) according to the clock count. The notification is provided when the diagnosis circuit 1 (300) performs count-up operation normally.

The diagnosis circuit 2 (310) conducts operation diagnosis of the diagnosis circuit 1 (300). When the notification of the clock count is sent from the diagnosis circuit 1 (300), the diagnosis circuit 2 (310) outputs a diagnosis result signal 2 (HIGH) indicating that the diagnosis circuit 1 (300) is in normal condition. The diagnosis result signal 2 is supplied to the diagnosis circuit 1 (300) and the diagnosis circuit 3 (320).

The diagnosis circuit 3 (320) supplies a diagnosis result signal 3 to the diagnosis circuit 1 (300) and the diagnosis circuit 2 (310). The diagnosis result signal 3 is a pulse signal that becomes HIGH only when the watchdog timer 1 (200) is normally operating, just like in the first and second embodiments. Further, the diagnosis circuit 3 (320) supplies an operation notification signal indicating that the diagnosis circuit 3 (320) itself is normally operating to the diagnosis circuit 1 (300) and the diagnosis circuit 2 (310) on a regular basis.

Further, each diagnosis circuit (the diagnosis circuits 1 to 3) includes an internal abnormal part identifying circuit. The abnormal part identifying circuit is a circuit that identifies a single abnormal part based on a diagnosis table (FIG. 6), which is described later. When an abnormal part is identified, each diagnosis circuit notifies the abnormal part to the CPU 100 by using an anomaly notification signal.

Next, a relationship between a diagnosis result of each diagnosis circuit and an abnormal part is described with reference to FIG. 6. Note that, in a general semiconductor device or the like, it is rare that anomalies occur at the same time in the watchdog timer and the diagnosis circuit. Therefore, in this embodiment, a method that the abnormal part identifying circuit in each diagnosis circuit identifies an abnormal part is described on the assumption that there is only one abnormal part. In the table, "NO SUPPLY OF DIAGNOSIS RESULT SIGNAL 1 (HIGH)" indicates that the diagnosis result signal 1 of HIGH level is not supplied to the diagnosis circuit 2 (310) and the diagnosis circuit 3 (320). "NO SUPPLY OF DIAGNOSIS RESULT SIGNAL 2 (HIGH)" indicates that the diagnosis result signal 2 of HIGH level is not supplied to the diagnosis circuit 1 (300) and the diagnosis circuit 3 (320). "NO SUPPLY OF DIAGNOSIS RESULT SIGNAL 3 (HIGH)" indicates that the diagnosis result signal 3 of HIGH level is not supplied to the diagnosis circuit 1 (300) and the diagnosis circuit 2 (310).

When the diagnosis result signals of HIGH level (diagnosis result signals 1 to 3) from the other circuits are supplied and it is determined that a monitoring target is normally operating, the abnormal part identifying circuit determines that there is no abnormal part ("1", "3" and "5" in the table).

When the diagnosis result signals of HIGH level (diagnosis result signals 1 to 3) from the other circuits are supplied and it is determined that a monitoring target is not normally operating, the abnormal part identifying circuit determines that the monitoring target that is not normally operating is abnormal ("2", "4" and "6" in the table). For example, when the abnormal part identifying circuit in the diagnosis circuit 1 (300) receives the diagnosis result signals of HIGH level from the other circuits and determines that the watchdog timer 2 (210), which is a monitoring target, is in abnormal condition, it determines that the abnormal part is the watchdog timer 2 (210) ("2" in the table).

Next, the case where the diagnosis result signal 1 of HIGH level is not supplied is described. In this case, the watchdog timer 2 (210), which is a target of monitoring by the diagnosis circuit 1 (300), or the diagnosis circuit 1 (300) is in abnormal condition. When the operation notification signal is normally supplied from the diagnosis circuit 1 (300), the diagnosis circuit 1 (300) is in normal condition. Therefore, when there is no other part that is determined to be abnormal, the abnormal part identifying circuit determines that the watchdog timer 2 (210) is abnormal ("7", "11" in the table). When it is determined that the watchdog timer 1 (200) is also abnormal ("13" in the table), there are a plurality of abnormal parts, and the abnormal part identifying circuit is unable to identify a single abnormal part. Note that, "9" in the table is out of consideration because there is a contradiction in that the diagnosis circuit 1 (300) is abnormal while the diagnosis circuit 1 (300) supplies the operation notification signal.

On the other hand, when the operation notification signal is not supplied from the diagnosis circuit 1 (300), the diagnosis circuit 1 (300) is in abnormal condition. Therefore, when there is no other part that is determined to be abnormal, the abnormal part identifying circuit determines that the diagnosis circuit 1 (300) is abnormal ("8", "10", "12" in the table). When it is determined that the watchdog timer 1 (200) is also abnormal ("14" in the table), there are a plurality of abnormal parts, and the abnormal part identifying circuit is unable to identify a single abnormal part.

Then, the case where the diagnosis result signal 2 of HIGH level is not supplied is described. In this case, the diagnosis circuit 1 (300), which is a target of monitoring by the diagnosis circuit 2 (310), or the diagnosis circuit 2 (310) is in abnormal condition. When the operation notification signal is supplied from the diagnosis circuit 2 (310), the diagnosis circuit 2 (310) is in normal condition. Therefore, when there is no other part that is determined to be abnormal, the abnormal part identifying circuit determines that the diagnosis circuit 1 (300) is abnormal ("15", "19" in the table). When there is another part that is determined to be abnormal ("17", "21" in the table), there are a plurality of abnormal parts, and the abnormal part identifying circuit is unable to identify a single abnormal part.

On the other hand, when the operation notification signal is not supplied from the diagnosis circuit 2 (310), the diagnosis circuit 2 (310) is in abnormal condition. Therefore, when there is no other part that is determined to be abnormal, the abnormal part identifying circuit determines that the diagnosis circuit 2 (310) is abnormal ("16", "20" in the table). When it is determined that the watchdog timer 2 (210) is also abnormal ("18" in the table), the abnormal part identifying circuit is unable to identify a single abnormal part. Likewise, when it is determined that the watchdog timer 1 (200) is also in abnormal condition ("22" in the table), there are a plurality of abnormal parts, and the abnormal part identifying circuit is unable to identify a single abnormal part.

Further, the case where the diagnosis result signal 3 of HIGH level is not supplied is described. In this case, the watchdog timer 1 (200), which is a target of monitoring by the diagnosis circuit 3 (320), or the diagnosis circuit 3 (320) is in abnormal condition. When the operation notification signal is supplied from the diagnosis circuit 3 (320), the diagnosis circuit 3 (320) is in normal condition. Therefore, when there is no other part that is determined to be abnormal, the abnormal part identifying circuit determines that the watchdog timer 1 (200) is abnormal ("23", "27" in the table). When it is determined that the watchdog timer 2 (210) or the diagnosis circuit 1 (300) is also abnormal ("25", "29" in the table), there are a plurality of abnormal parts, and the abnormal part identifying circuit is unable to identify a single abnormal part.

On the other hand, when the operation notification signal is not supplied from the diagnosis circuit 3 (320), the diagnosis circuit 3 (320) is in abnormal condition. Therefore, when there is no other part that is determined to be abnormal, the abnormal part identifying circuit determines that the diagnosis circuit 3 (320) is abnormal ("24", "28" in the table). When it is determined that the watchdog timer 2 (210) or the diagnosis circuit 1 (300) is also abnormal ("26", "30" in the table), there are a plurality of abnormal parts, and the abnormal part identifying circuit is unable to identify a single abnormal part.

Advantages of the semiconductor device according to the embodiment are described hereinafter. As described above, the diagnosis circuits notify that they are normally operating to one another. Therefore, when the diagnosis result signal of HIGH level is not supplied, the abnormal part identifying circuit can make it clear whether a target of monitoring is abnormal or the diagnosis circuit that is conducting monitoring is abnormal. For example, when the diagnosis result signal 1 of HIGH level is not supplied and the operation notification signal is normally supplied from the diagnosis circuit 1 (300), the abnormal part identifying circuit can identify that the watchdog timer 2 (210) is abnormal. Further, when the diagnosis result signal 2 of HIGH level is not supplied and the operation notification signal is normally supplied from the diagnosis circuit 2 (310), the abnormal part identifying circuit can identify that the diagnosis circuit 1 (300) is abnormal. In this manner, the abnormal part can be precisely detected. With the precise detection of the abnormal part, the CPU 100 can perform appropriate fail-safe operation according to the abnormal part.

It should be noted that the fail-safe operation is substantially the same as the operation described in the first and second embodiments. For example, when the watchdog timer 2 (210) is in abnormal condition, the CPU 100 shuts down the watchdog timer 2 (210).

The operation notification signal that is output from the diagnosis circuit 1 (300) corresponds to a second operation notification signal described in the appended claims. The operation notification signal that is output from the diagnosis circuit 3 (320) corresponds to a third operation notification signal described in the appended claims. The correspondence is the same in the following embodiments.

Fourth Embodiment

Figure 7:
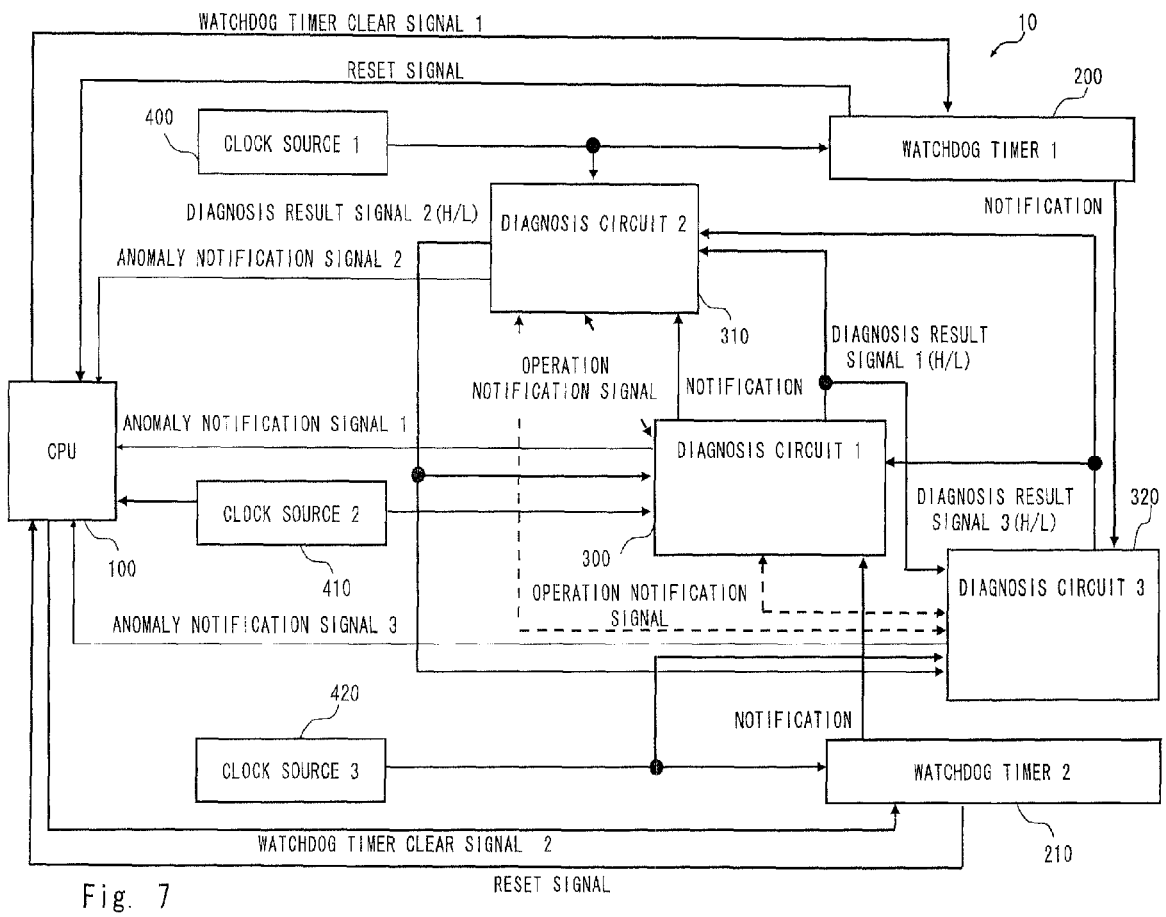
FIG. 7 is a block diagram showing a configuration of a semiconductor device according to a fourth embodiment.

A semiconductor device according to a fourth embodiment of the invention is characterized in that it includes a plurality of clock sources. The basic configuration and operation of the semiconductor device according to the embodiment are described hereinafter with reference to FIG. 7, focusing on differences from the first, second and third embodiments. Note that, in the semiconductor device according to the embodiment also, it is assumed that there is only one abnormal part to be identified.

The semiconductor device includes a clock source 1 (400), a clock source 2 (410) and a clock source 3 (420) in addition to the configuration of the semiconductor device according to the third embodiment. The clock source 1 (400) supplies a clock to the watchdog timer 1 (200) and the diagnosis circuit 2 (310). The clock source 2 (410) supplies a clock to the CPU 100 and the diagnosis circuit 1 (300). The clock source 3 (420) supplies a clock to the watchdog timer 2 (210) and the diagnosis circuit 3 (320). Note that the operating frequencies of the respective clock sources are not necessarily the same.

Figure 8:
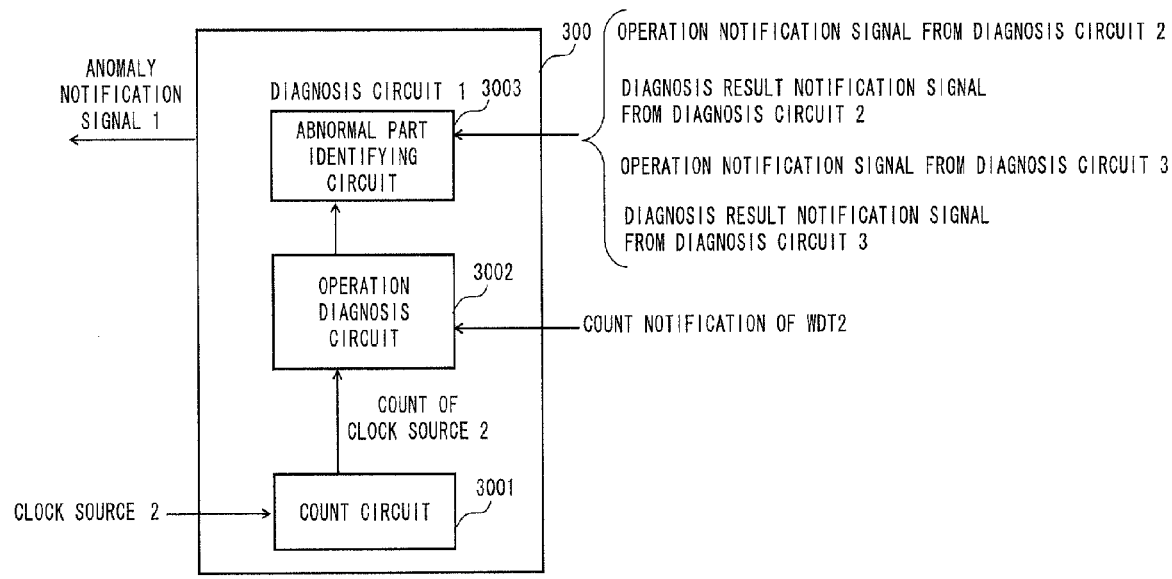
FIG. 8 is a block diagram showing details of a diagnosis circuit 1 according to the fourth embodiment.

The configuration of the diagnosis circuit 1 (300) in this embodiment is described hereinafter with reference to FIG. 8. The diagnosis circuit 1 (300) includes a count circuit 3001, an operation diagnosis circuit 3002, and an abnormal part identifying circuit 3003. The count circuit 3001 is a circuit that counts the clock supplied from the clock source 2 (410). The count circuit 3001 notifies the count of the clock to the operation diagnosis circuit 3002.

The operation diagnosis circuit 3002 receives a notification from the watchdog timer 2 (210) (a notification that is provided each time the clock is supplied to the watchdog timer 2 (210)) and the count of the clock from the count circuit 3001. The operation diagnosis circuit 3002 conducts operation diagnosis of the watchdog timer 2 (210) based on a relationship between the operating frequency of the clock source 2 (410) and the operating frequency of the clock source 3 (420) that supplies the clock to the watchdog timer 2 (210).

It is assumed, for example, that the operating frequency of the clock source 2 (410) is 80 Hz, and the operating frequency of the clock source 3 (420) is 20 Hz. In this case, the operation diagnosis circuit 3002, for example, determines whether a notification is given one or more times from the watchdog timer 2 (210) while the clocks is supplied five times from the clock source 2 (410). When a notification is given one or more times, the operation diagnosis circuit 3002 determines that the watchdog timer 2 (210) is operating. The operation diagnosis circuit 3002 notifies the determination result to the abnormal part identifying circuit 3003.

The diagnosis result from the operation diagnosis circuit 3002 is supplied to the abnormal part identifying circuit 3003. Further, the operation notification signal and the diagnosis result signal 2 from the diagnosis circuit 2 (310) are supplied to the abnormal part identifying circuit 3003. Likewise, the operation notification signal and the diagnosis result signal 3 from the diagnosis circuit 3 (320) are supplied to the abnormal part identifying circuit 3003.

The abnormal part identifying circuit 3003 is a circuit that identifies a single abnormal part based on a diagnosis table (FIG. 9), which is described later. When an abnormal part is identified, each diagnosis circuit notifies the abnormal part to the CPU 100 by using an anomaly notification signal. Note that the configurations of the diagnosis circuit 2 (310) and the diagnosis circuit 3 (320), though not shown, are substantially the same as the configuration shown in FIG. 8.

Next, a relationship between a diagnosis result of each diagnosis circuit and an abnormal part is described with reference to FIG. 9. For "1" to "6" in FIG. 9, determination is made in the similar manner to the third embodiment, and detailed explanation thereof is omitted.

The case where the diagnosis result signal 1 of HIGH level is not supplied is described. In this case, any of the watchdog timer 2 (210), which is a target of monitoring by the diagnosis circuit 1 (300), the diagnosis circuit 1 (300), and the clock source 2 (410) which supplies the clock to the diagnosis circuit 1 (300) is in abnormal condition. When the operation notification signal is supplied from the diagnosis circuit 1 (300), the diagnosis circuit 1 (300) and the clock source 2 (410) are in normal condition. Therefore, when there is no other part that is determined to be abnormal, the abnormal part identifying circuit determines that the watchdog timer 2 (210) is abnormal ("7", "11" in the table). When it is determined that the watchdog timer 1 (200) is also in abnormal condition ("13" in the table), the abnormal part identifying circuit is unable to identify a single abnormal part.

On the other hand, when the operation notification signal is not supplied from the diagnosis circuit 1 (300), the diagnosis circuit 1 (300) or the clock source 2 (410) is in abnormal condition. When the clock source 2 (410) is abnormal, no clock is supplied to the CPU 100, and therefore the CPU 100 outputs a reset signal. Thus, when there is no other part that is determined to be abnormal and when the reset signal is not output from the CPU 100, the abnormal part identifying circuit determines that the diagnosis circuit 1 (300) is abnormal ("8", "10", "12" in the table). Further, when there is no other part that is determined to be abnormal and when the reset signal is output from the CPU 100, the abnormal part identifying circuit determines that the clock source 2 (410) is abnormal ("8", "10", "12" in the table). When it is determined that the watchdog timer 1 (200) is also abnormal ("14" in the table), the abnormal part identifying circuit is unable to identify a single abnormal part.

Next, the case where the diagnosis result signal 2 of HIGH level is not supplied is described. In this case, any of the diagnosis circuit 1 (300), which is a target of monitoring by the diagnosis circuit 2 (310), the diagnosis circuit 2 (310), and the clock source 1 (400) which supplies the clock to the diagnosis circuit 2 (310) is in abnormal condition. When the operation notification signal is supplied from the diagnosis circuit 2 (310), the diagnosis circuit 2 (310) and the clock source 1 (400) are in normal condition. Therefore, when there is no other part that is determined to be abnormal, the abnormal part identifying circuit determines that the diagnosis circuit 1 (300) is abnormal ("15", "19" in the table). When there is another part that is determined to be abnormal ("17", "21" in the table), the abnormal part identifying circuit is unable to identify a single abnormal part.

On the other hand, when the operation notification signal is not supplied from the diagnosis circuit 2(310), the diagnosis circuit 2 (310) or the clock source 1 (400) is in abnormal condition. When the watchdog timer 2 (210) is determined to be normal ("16" in the table), while the normal operation of the clock source 3 (420) can be determined, the abnormal part identifying circuit is unable to identify a single abnormal part. When the watchdog timer 1 (200) is determined to be normal ("20" in the table), it turns out that the clock source 1 (400) which supplies the clock to the watchdog timer 1 (200) is in normal condition. Therefore, the abnormal part identifying circuit determines that the diagnosis circuit 2 (310) is abnormal ("20" in the table). When the watchdog timer 2 (210) is determined to be abnormal ("18" in the table), the abnormal part identifying circuit is unable to identify a single abnormal part. When the watchdog timer 1 (200) is determined to be abnormal ("22" in the table), the abnormal part identifying circuit identifies that the clock source 1 (400) which supplies the clock to the watchdog timer 1 (200) is abnormal.

Further, the case where the diagnosis result signal 3 of HIGH level is not supplied is described. In this case, any of the watchdog timer 1 (200), which is a target of monitoring by the diagnosis circuit 3 (320), the diagnosis circuit 3 (320), and the clock source 3 (420) which supplies the clock to the diagnosis circuit 3 (320) is in abnormal condition. When the operation notification signal is supplied from the diagnosis circuit 3 (320), the diagnosis circuit 3 (320) and the clock source 3 (420) are in normal condition. Therefore, when there is no other part that is determined to be abnormal, the abnormal part identifying circuit determines that the watchdog timer 1 (200) is abnormal ("23", "27" in the table). When it is determined that the watchdog timer 2 (210) or the diagnosis circuit 1 (300) is also abnormal ("25", "29" in the table), there are a plurality of abnormal parts, and the abnormal part identifying circuit is unable to identify a single abnormal part.

On the other hand, when the operation notification signal is not supplied from the diagnosis circuit 3 (320), the diagnosis circuit 3 (320) or the clock source 3 (420) is in abnormal condition. When the watchdog timer 2 (210) is determined to be normal ("24" in the table), the clock source 3 (420) which supplies the clock to the watchdog timer 2 (210) is normally operating. Therefore, the abnormal part identifying circuit determines that the diagnosis circuit 3 (320) is abnormal ("24" in the table). When the diagnosis circuit 1 (300) is determined to be normal ("28" in the table), the abnormal part identifying circuit is unable to identify a single abnormal part. When the diagnosis circuit 1 (300) is determined to be abnormal ("30" in the table), there are a plurality of abnormal parts, and the abnormal part identifying circuit is unable to identify a single abnormal part. When the watchdog timer 2 (210) is determined to be abnormal ("26" in the table), the clock source 3 (420) which supplies the clock to the watchdog timer 2 (210) is likely to be abnormal. Therefore, the abnormal part identifying circuit identifies that the abnormal part is the clock source 3 (420) ("26" in the table).

Figure 10:
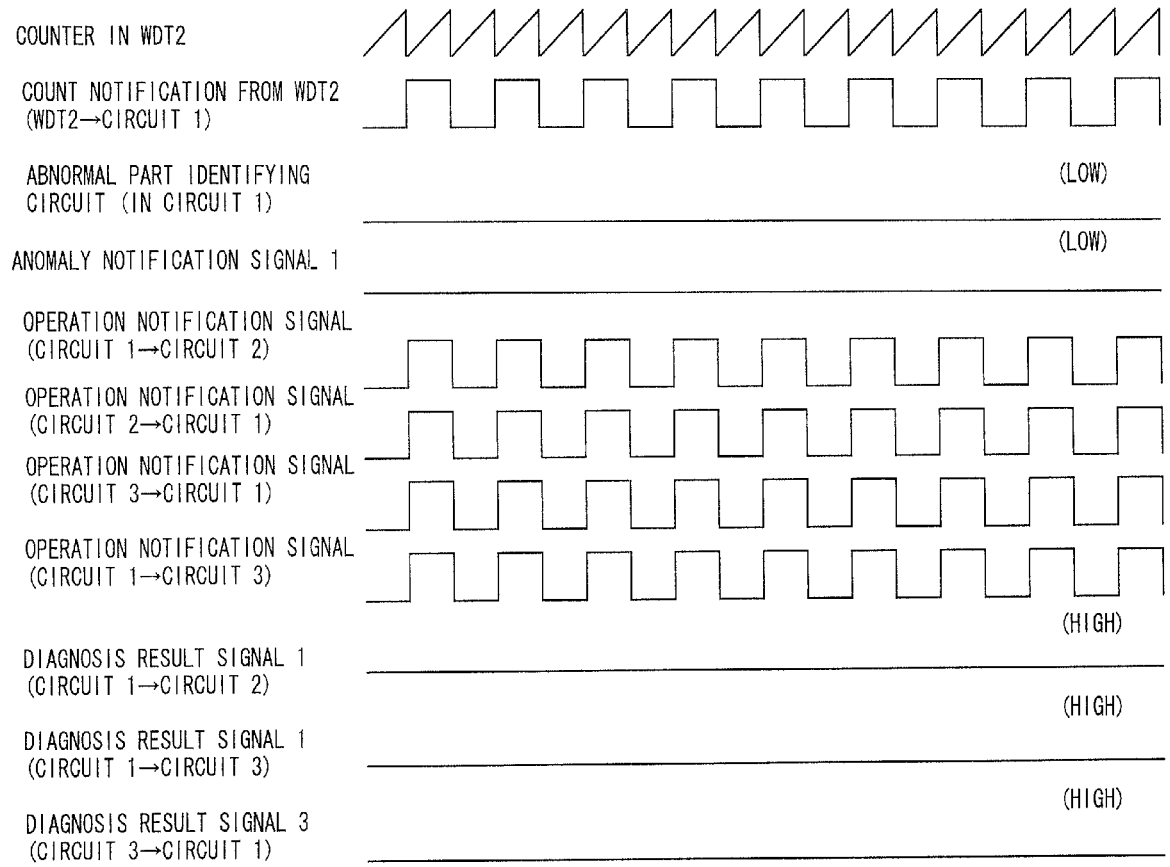
FIG. 10 is a timing chart showing an operation of the semiconductor device according to the fourth embodiment.

The operation of each processing unit that relates to the diagnosis circuit 1 (300) is described hereinafter with reference to timing charts of FIGS. 10 to 12. FIG. 10 is a timing chart showing processing in normal operating condition.

In normal operating condition, the watchdog timer 2 (210) continues to count the clock normally. Further, a notification of the clock count from the watchdog timer 2 (210) is given to the diagnosis circuit 1 (300) at regular time intervals. Further, each diagnosis circuit supplies operation notification signals to the other diagnosis circuits at regular time intervals.

The diagnosis circuit 1 (300) notifies a diagnosis result indicating that the watchdog timer 2 (210) is normally operating (the diagnosis result signal 1) to the other diagnosis circuits. The diagnosis result signal 3 indicating that the watchdog timer 1 (200) is normally operating is supplied from the diagnosis circuit 3 (320) to the diagnosis circuit 1 (300).

Therefore, the abnormal part identifying circuit in the diagnosis circuit 1 (300) determines that there is no abnormal processing unit (the signal stays LOW). Further, the diagnosis result signal 1 that is output from the diagnosis circuit 1 (300) is at LOW level indicating that there is no abnormal part.

The operation of each processing unit in the case where the watchdog timer 2 (210) comes in abnormal condition is described hereinafter with reference to FIG. 11. In this example, the watchdog timer 2 (210) becomes abnormal at time T1. In this case, a notification of the clock count ceases to be provided from the watchdog timer 2 (210) to the diagnosis circuit 1 (300). When the count notification is not provided for a specified period of time, the abnormal part identifying circuit in the diagnosis circuit 1 (300) refers to diagnosis results of the other diagnosis circuits. In this example, an anomaly from the other diagnosis circuits is not notified. Therefore, at time T2, the abnormal part identifying circuit detects that the watchdog timer 2 (210) is abnormal.

When the anomaly is detected, the diagnosis circuit 1 (300) outputs the diagnosis result signal 1 indicating that the watchdog timer 2 (210) is abnormal to the CPU 100.

Further, the operation of each processing unit in the case where the diagnosis circuit 3 (320) comes in abnormal condition is described hereinafter with reference to FIG. 12. In this example, the diagnosis circuit 3 (320) becomes abnormal at time T3. In this case, the diagnosis circuit 3 (320) ceases to supply the operation notification signal to the other diagnosis circuits.

At this time, because the count notification from the watchdog timer 2 (210) is provided, the abnormal part identifying circuit in the diagnosis circuit 1 (300) determines, at time T4, that the clock source 3 (420) is normal and that the diagnosis circuit 3 (320) is abnormal.

Therefore, the diagnosis circuit 1 (300) notifies that the diagnosis circuit 3 (320) is abnormal to the CPU 100 by the anomaly notification signal 1.

Figure 11:
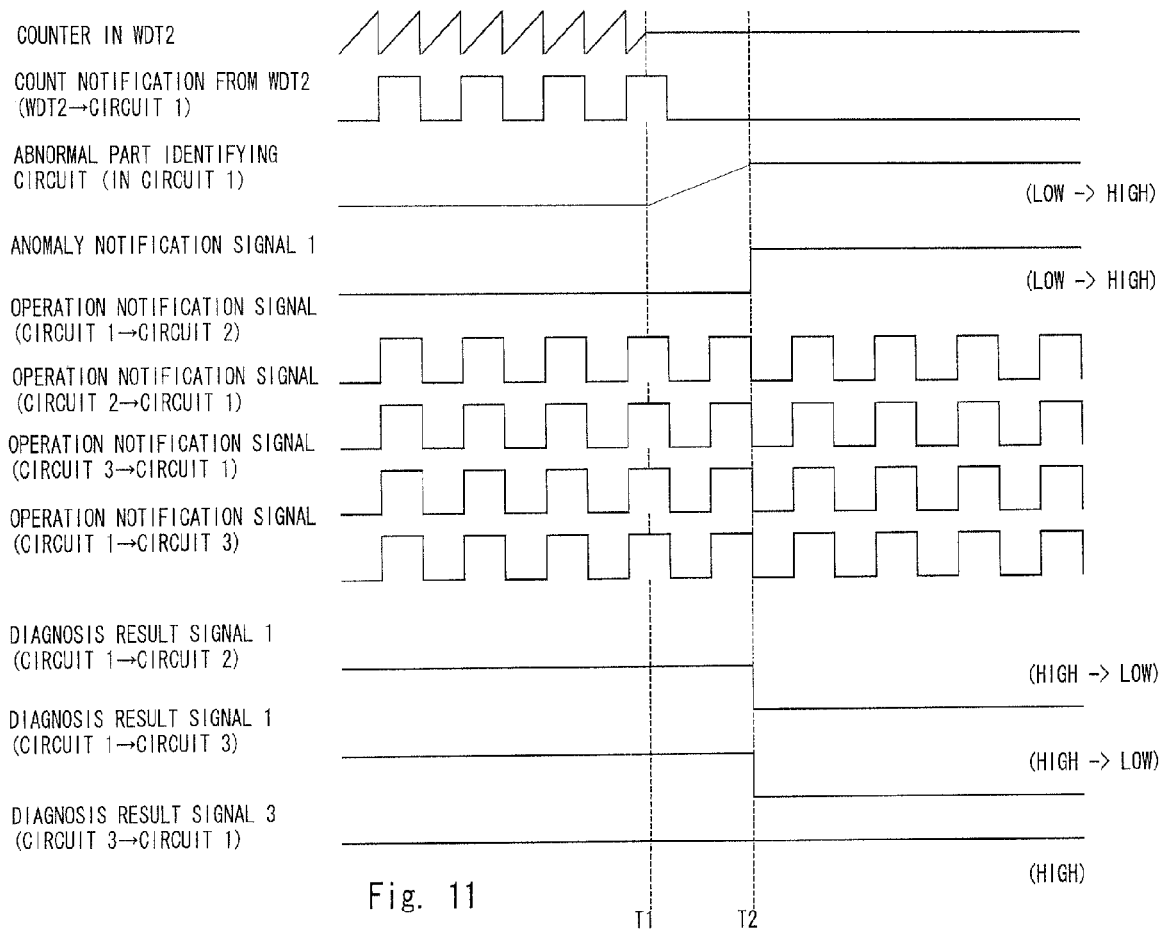
FIG. 11 is a timing chart showing an operation of the semiconductor device according to the fourth embodiment.
Figure 12:
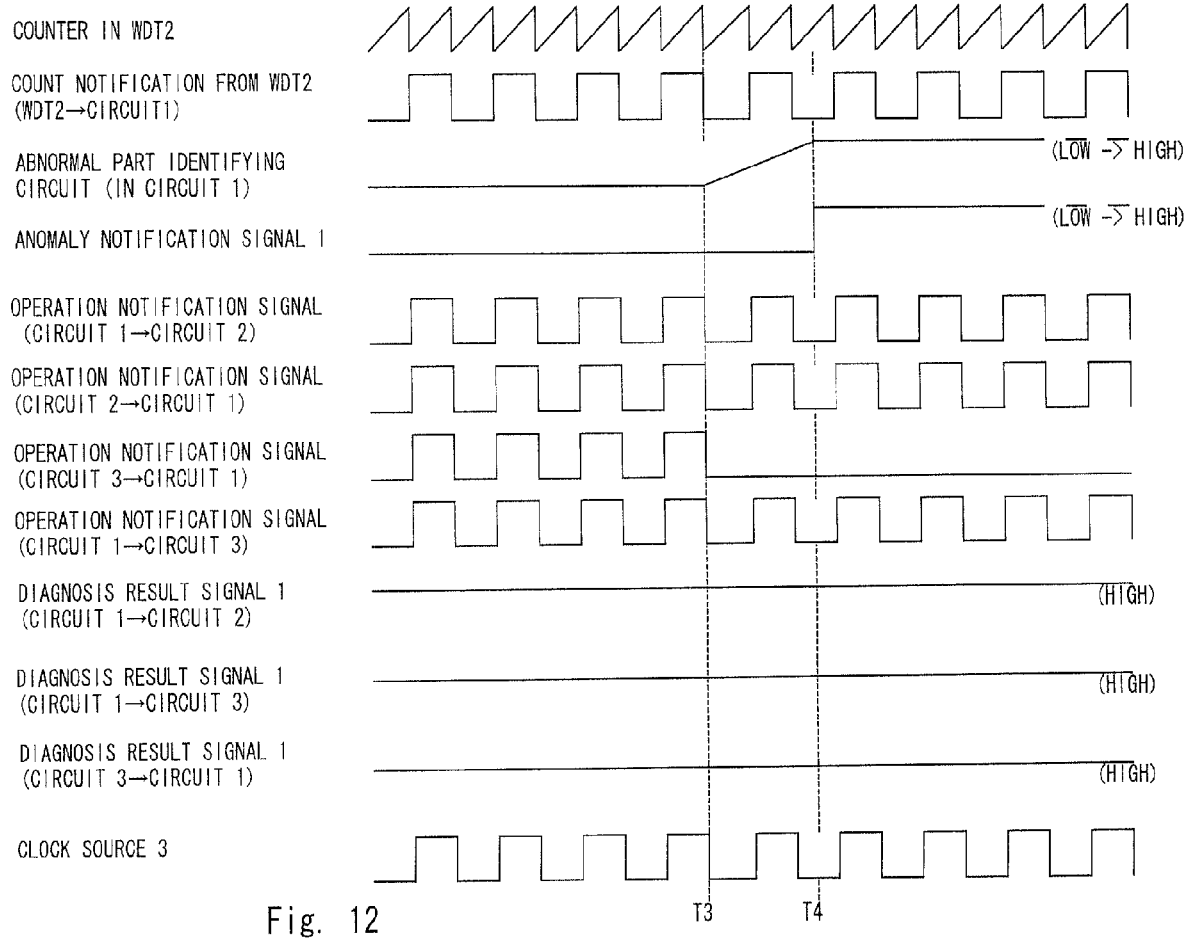
FIG. 12 is a timing chart showing an operation of the semiconductor device according to the fourth embodiment.

The timing charts for the other diagnosis circuits may be substantially the same as those shown in FIGS. 10 to 12. Note that the fail-safe operation that is performed after identifying the abnormal part is substantially the same as the operation described in the first to third embodiments.

Advantages of the semiconductor device according to the embodiment are described hereinafter. As described above, the semiconductor device according to the embodiment includes a plurality of clock sources. Therefore, even when one clock source becomes abnormal, a circuit or the like that is supplied with a clock from another clock source can continue to operate normally.

Further, by precisely identifying an abnormal part based on the above-described diagnosis table (FIG. 9), fail-safe operation corresponding only to the abnormal part can be performed. For example, when it is determined that the diagnosis circuit 2 (310) is abnormal, the clock source 1 (400) is normal. Therefore, it is possible to perform the fail-safe operation corresponding the anomaly of the diagnosis circuit 2 (310) without turning off the clock source 1 (400).

The clock source 1 (400) corresponds to a first clock source described in the appended claims. The clock source 2 (410) corresponds to a second clock source described in the appended claims. The clock source 3 (420) corresponds to a third clock source described in the appended claims. The correspondence is the same in the following embodiment.

Fifth Embodiment

Figure 13:
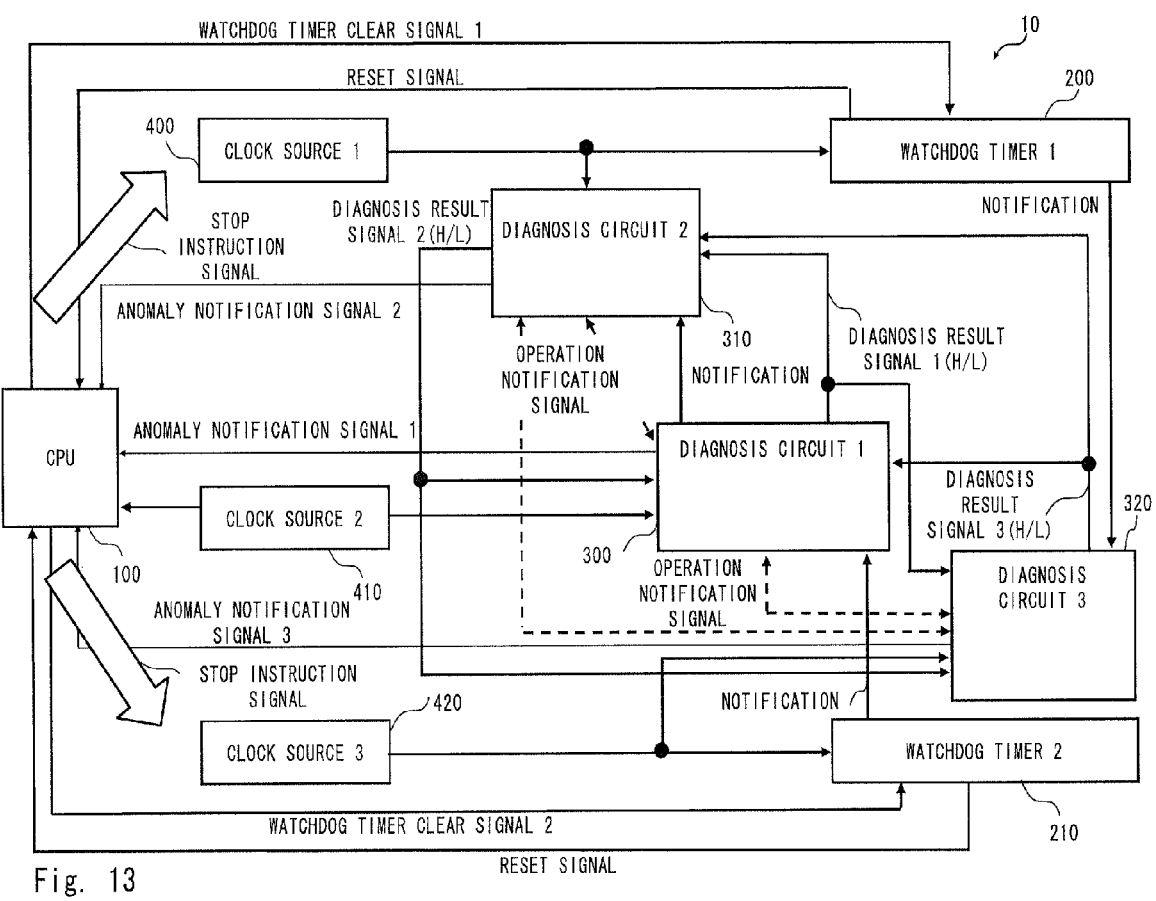
FIG. 13 is a block diagram showing a configuration of a semiconductor device according to a fifth embodiment.

A semiconductor device according to a fifth embodiment of the invention is characterized in that the internal configuration of the diagnosis circuit is altered so that an anomaly of the frequency of the clock source can be also determined. The basic configuration and operation of the semiconductor device according to the embodiment are described hereinafter with reference to FIG. 13, focusing on differences from the fourth embodiment.

The CPU 100 according to the embodiment turns off a clock source when it is determined that a frequency anomaly is occurring in the clock source. A method of determining a frequency anomaly is described later.

The configuration of the diagnosis circuit 1 (300) according to the embodiment is described with reference to FIG. 14. The diagnosis circuit 1 (300) according to the embodiment has a configuration in which the operation diagnosis circuit 3002 of the diagnosis circuit 1 (300) according to the fourth embodiment is replaced with a difference detection circuit 3004.

The difference detection circuit 3004 detects whether the watchdog timer 2 (210) is operating and whether a frequency anomaly is occurring in the clock source 3 (420) that supplies the clock to the watchdog timer 2 (210). The difference detection circuit 3004 conducts diagnosis as to whether the watchdog timer 2 (210) is operating and whether a frequency anomaly is occurring in the clock source 3 (420) based on a relationship between the operating frequency of the clock source 2 (410) and the operating frequency of the clock source 3 (420).

It is assumed, for example, that the operating frequency of the clock source 2 (410) is 80 Hz, and the operating frequency of the clock source 3 (420) is 20 Hz. In this case, a relationship between the count of the watchdog timer 2 (210) that is notified while the clock source 2 (410) counts the clock five times and a diagnosis result is shown n FIG. 15.

In this case, in theory, a notification of the count is given slightly more than one time from the watchdog timer 2 (210) while the clock source 2 (410) counts the clock five times. Thus, when the count from the watchdog timer 2 (210) is one or two times, the difference detection circuit 3004 determines that the watchdog timer 2 (210) is in normal condition. On the other hand, when the count is zero, the difference detection circuit 3004 determines that the watchdog timer 2 (210) is not operating and in abnormal condition. After that, the diagnosis result is notified to the abnormal part identifying circuit 3003, and an abnormal part is identified. A method of identifying an abnormal part is substantially the same as that described in the fourth embodiment.

On the other hand, when the count from the watchdog timer 2 (210) is three or more times, the operating frequency of the clock source 3 (420) is abnormal. In this case, the difference detection circuit 3004 supplies an anomaly notification signal 1 indicating that an anomaly is occurring in the clock source 3 (420) to the CPU 100.

Receiving a notification about the frequency anomaly, the CPU 100 immediately turns off the clock source 3 (420) where the frequency anomaly is occurring.

Figure 14:
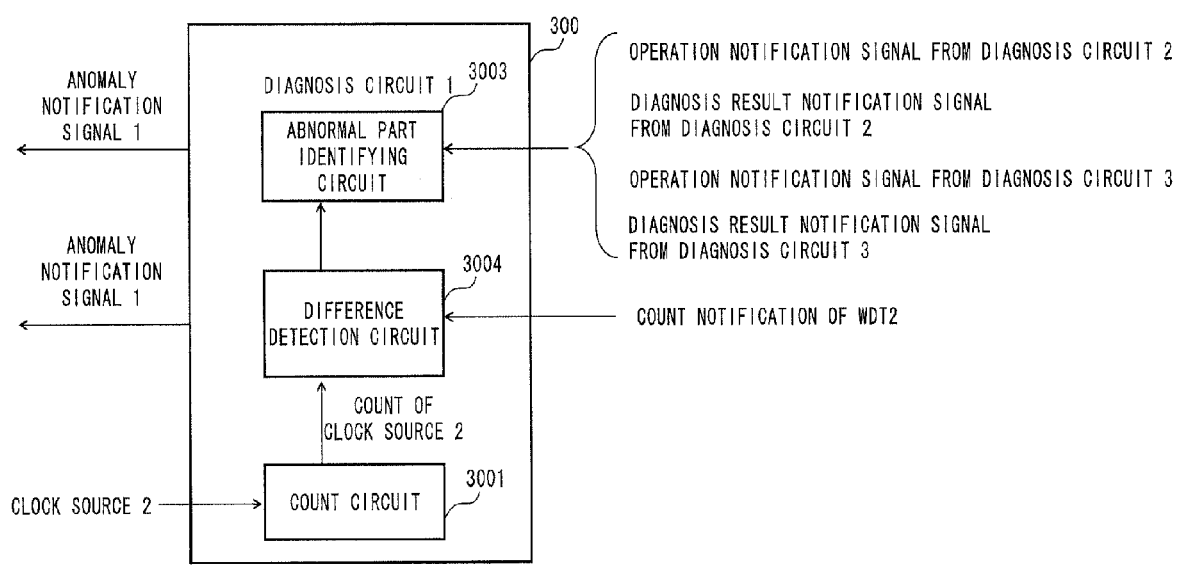
FIG. 14 is a block diagram showing details of a diagnosis circuit 1 according to the fifth embodiment.

Note that the configurations of the diagnosis circuit 2 (310) and the diagnosis circuit 3 (320), though not shown, are substantially the same as the configuration shown in FIG. 14.

In the above-described configuration, an anomaly of the operating frequency of the clock source can be detected. It is thereby possible to perform fail-safe operation such as turning off the clock source where the frequency anomaly is occurring. The fail-safe operation prevents a defect that the operating frequency of the clock source is too high, and a reset signal is improperly supplied from the watchdog timer to the CPU 100.

It should be noted that the present invention is not limited to the above-described embodiments, and various changes and modifications may be made without departing from the scope of the invention. The above-described semiconductor device may be incorporated into a calculator.

The above-described embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a central processing unit (CPU);
a first watchdog timer that monitors a runaway of the CPU;
a second watchdog timer that monitors the runaway of the CPU;
a first diagnosis circuit that monitors the first watchdog timer and generates a first diagnosis result signal; and
a second diagnosis circuit that monitors the second watchdog timer and generates a second diagnosis result signal,
wherein the first diagnosis circuit receives the second diagnosis result signal and the second diagnosis circuit receives the first diagnosis result signal, and wherein the first and second diagnosis circuits monitor each other by the first and second diagnosis result signals.

2. The semiconductor device according to claim 1, wherein the first diagnosis result signal includes a first operation notification signal indicating that the first diagnosis circuit is normally operating, and the second diagnosis result signal includes a second operation notification signal indicating that the second diagnosis circuit is normally operating.

3. The semiconductor device according to claim 2, wherein the first diagnosis circuit generates the first operation notification signal at a predetermined period and the second diagnosis circuit generates the second operation notification signal at a predetermined period.

4. The semiconductor device according to claim 2, wherein when the first diagnosis circuit does not receive the second operation notification signal, the first diagnosis circuit determines that the second diagnosis circuit is in abnormal condition, and wherein when the second diagnosis circuit does not receive the first operation notification signal, the second diagnosis circuit determines that the first diagnosis circuit is in abnormal condition.

5. The semiconductor device according to claim 1, further comprising:

a third diagnosis circuit that monitors the first and second diagnosis circuits and generates a third diagnosis result signal, wherein the third diagnosis circuit receives the first and second diagnosis result signals, wherein the first diagnosis circuit further receives the third diagnosis result signal and the second diagnosis circuit further receives the third diagnosis result signal, and wherein the first, second and third diagnosis circuit monitor each other by the first, second and third diagnosis result signals.

6. The semiconductor device according to claim 5, wherein the third diagnosis result signal includes a third operation notification signal indicating that the third diagnosis circuit is normally operating.

7. The semiconductor device according to claim 6, wherein the third diagnosis circuit generates the third operation notification signal at a predetermined period.

8. The semiconductor device according to claim 6, wherein when the first diagnosis circuit does not receive the third operation notification signal, the first diagnosis circuit determines that the third diagnosis circuit is in abnormal condition.

* * * * *